United States Patent
Uy et al.

(10) Patent No.: US 8,687,375 B2
(45) Date of Patent: Apr. 1, 2014

(54) AUTOMATED DISTRESS LOCATOR TRANSMISSION SYSTEM

(76) Inventors: Rafael Q. Uy, Cavite (PH); Mansueto B. Callao, Pasig (PH)

( * ) Notice: Subject to any disclaimer, the term of this patent is extended or adjusted under 35 U.S.C. 154(b) by 256 days.

(21) Appl. No.: 13/383,780

(22) PCT Filed: Aug. 7, 2009

(86) PCT No.: PCT/PH2009/000011
§ 371 (c)(1),
(2), (4) Date: Jan. 12, 2012

(87) PCT Pub. No.: WO2011/010942
PCT Pub. Date: Jan. 27, 2011

(65) Prior Publication Data
US 2012/0113575 A1 May 10, 2012

(30) Foreign Application Priority Data
Jul. 22, 2009 (PH) .............................. 1-2009-000240

(51) Int. Cl.
H05K 5/00 (2006.01)
B63B 22/00 (2006.01)
(52) U.S. Cl.
USPC ........................................... 361/754; 441/11
(58) Field of Classification Search
USPC ................... 361/754, 679.38, 725, 726, 727; 441/10, 11, 16, 17
See application file for complete search history.

(56) References Cited

U.S. PATENT DOCUMENTS

| 3,253,810 A * | 5/1966 | Charles ..................... 244/138 A |
| 6,093,069 A * | 7/2000 | Schelfhout ..................... 441/11 |
| 7,258,836 B2 * | 8/2007 | Hill et al. ....................... 422/50 |
| 2002/0062861 A1* | 5/2002 | Devall .......................... 137/202 |

* cited by examiner

Primary Examiner — Hoa C Nguyen
Assistant Examiner — Binh Tran
(74) Attorney, Agent, or Firm — Notaro, Michalos & Zaccaria P.C.

(57) ABSTRACT

The present invention relates to an automated distress locator transmitter assembly adapted to be installed on transportation means such as aircrafts and the like comprising: a base member having a primary enclosure downwardly formed from the surface thereof and defining a first peripheral flange thereon; a secondary enclosure having a second peripheral flange formed at the upper portion thereof, said secondary enclosure being enclosed within said primary enclosure and being provided with an ejector means; a locator transmitter member being provided within said secondary enclosure and secured on said ejector means; an associated cover being provided on said secondary enclosure, said associated cover being secured on said second peripheral flange; and means to secure and automatically detached said associated cover from said second peripheral flange to release and eject said locator transmitter member to a substantial distance away from said second enclosure at a predetermined switching command.

16 Claims, 17 Drawing Sheets

AUTOMATED DISTRESS LOCATOR TRANSMISSION SYSTEM

TECHNICAL FIELD

The present invention relates to distress signal devices for transportation means such as aircrafts and the like, more particularly to an Autonomous Distress Locator Transmission System (ADLTS) having an Emergency Locator Transmitter (ELT) adaptable for sea and land terrain that is automatically releasable and ejectable away from the downed aircraft to effectively send distress signal to authorize receiving entity.

BACKGROUND OF THE INVENTION

Presently, almost all private, commercial and military aircraft have Flight Data and Voice Data Recorder located at the pilot cockpit and/or at the tail section of the plane. These recorders are commonly called "Black Box". One example of the "Black Box" is as shown in the disclosure of U.S. Pat. No. 5,890,079 entitle: Remote Aircraft Flight Recorder and Advisory System. Some of these recorders are equipped with using G Switch to automatically power the ELT in the event the plane encounters a sudden escalation of "G" force signifying a crash situation.

Modern ELT have Crash Position Indicator (CPI) using COSPAS/SARSAT and Global Positioning system to expand the ELT range capabilities.

With a coverage of 121.5 MHz, 243 MHz, and 406.025 Mhz it is now possible to locate with pin-point accuracy the last known GPS Coordinates on CPI. At present, all GPS transmission should occur above water. When an aircraft crashed in the water, the Black Box or other ELT transmissions cannot reach the satellite receiver to notify search and rescue its exact position upon crash.

The Present "Black Box" configuration for aircrafts uses a ULB system (Underwater Locator Beacon). Once activated by G Switch, ULB can operate underwater only at a maximum radius of 3,000 meters for 30 days. However in order to locate the crash position, a "Hydrophone" or alike receiving equipment must be placed in the water within the prescribed radius range. Otherwise the Black box cannot be located.

SUMMARY OF THE INVENTION

To overcome the disadvantages of the present "black box", the present invention herein proposes a distress system, i.e. an automated distress locator transmitter system (ADLTS) that can automatically jettison the emergency locator transmitter (ELT) from the aircraft upon exceeding the specified or predetermined G-Force. The system contains fixed floatation material to be positively buoyant on water. There are two triggering device to initiate ELT ejection, i.e., using a G Switch and a Depth Switch. Depth switches as a redundant triggering system to ensure deployment of ADLTS if the aircraft crashes on water.

Once jettisoned, ADLTS will immediately surface on water and extends the floatation stabilizer releasing the antenna where the ELT is already operating and transmitting upon crash. The same happens when plane crashes on land. The ELT will be automatically released and ejected from the plane and to commence the distress transmission.

For rapid and immediate jettison, explosive bolt will detonate severing the bolts holding the ELT from the assembly. Because of ADLTS operates on standalone system, a number of these can be strategically installed on different location of the aircraft. Adapting ADLTS system ensures higher probability for the aircraft to successfully transmit distress signal and to be located even when the plane crashes and submerged in water.

Another object of the present invention is to provide an automated distress locator transmitter system (ADLTS) that can easily be installed on the transportation means, easily maintained and easy to operate.

These and other objects and advantages of the present invention will become apparent upon a reading of the ensuing detailed description taken in conjunction with the appended drawings.

DETAILED DESCRIPTION

Figure 1:
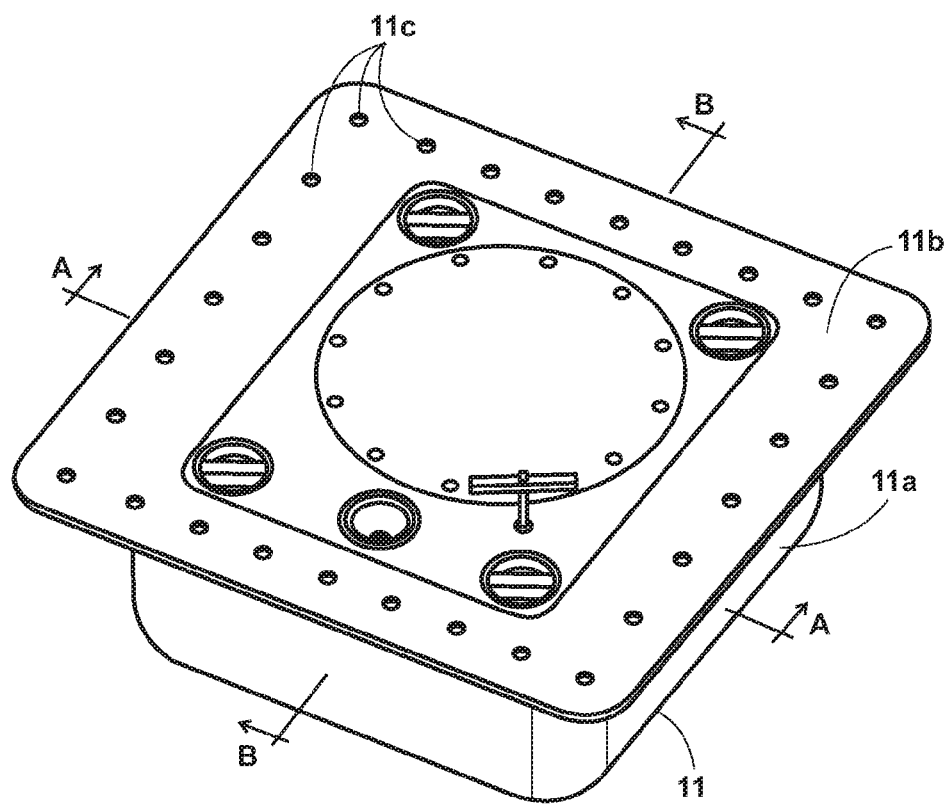
FIG. 1 is a perspective view showing the present invention for an automated distress locator transmitter assembly.

Before describing the invention in detail, it is to be understood that the phraseologies and terminologies used herein are for the purposes of description and should not be regarded as limiting.

Referring now to the different views of the drawings, wherein like reference numerals designate the steps, components or elements throughout the ensuing enabling description, the present invention provides for an automated distress locator transmitter assembly designated as 10.

Referring now to FIGS. 1 to 4, there is shown the automated distress locator transmitter assembly 10 of the present invention. The automated distress locator transmitter assembly 10 which is adapted to be installed on transportation means such as aircrafts and the like basically comprises of a base member 11 having a primary enclosure 11a downwardly formed from the surface thereof and defining a first peripheral flange 11b thereon, the first peripheral flange 11b is provided with holes 11c on the surface thereof, sidewalls 11d and bottom wall 11e, a second enclosure 12 enclosed within the primary enclosure 11a and is provided with an ejector means 13 disposed at the bottom portion thereof, a locator transmitter member 14 having a bottom wall 22b is provided within the secondary enclosure 12 and the bottom wall 22b secured to seat on the ejector means 13 which is preferably in the form of a spring member 15, and an associated cover 16 provided on the secondary enclosure 12. The associated cover 16 is provided with spaced apart holes proximate the peripheral edge thereof. The spring member 15 is biased in a position at the bottom portion of second enclosure 12 in such a manner as to accommodate the transmitter member 14 seated thereon to be ejected to a substantial distance away from the second enclosure 12 when the transmitter member 14 is suddenly released from the second enclosure 12.

Figure 3:
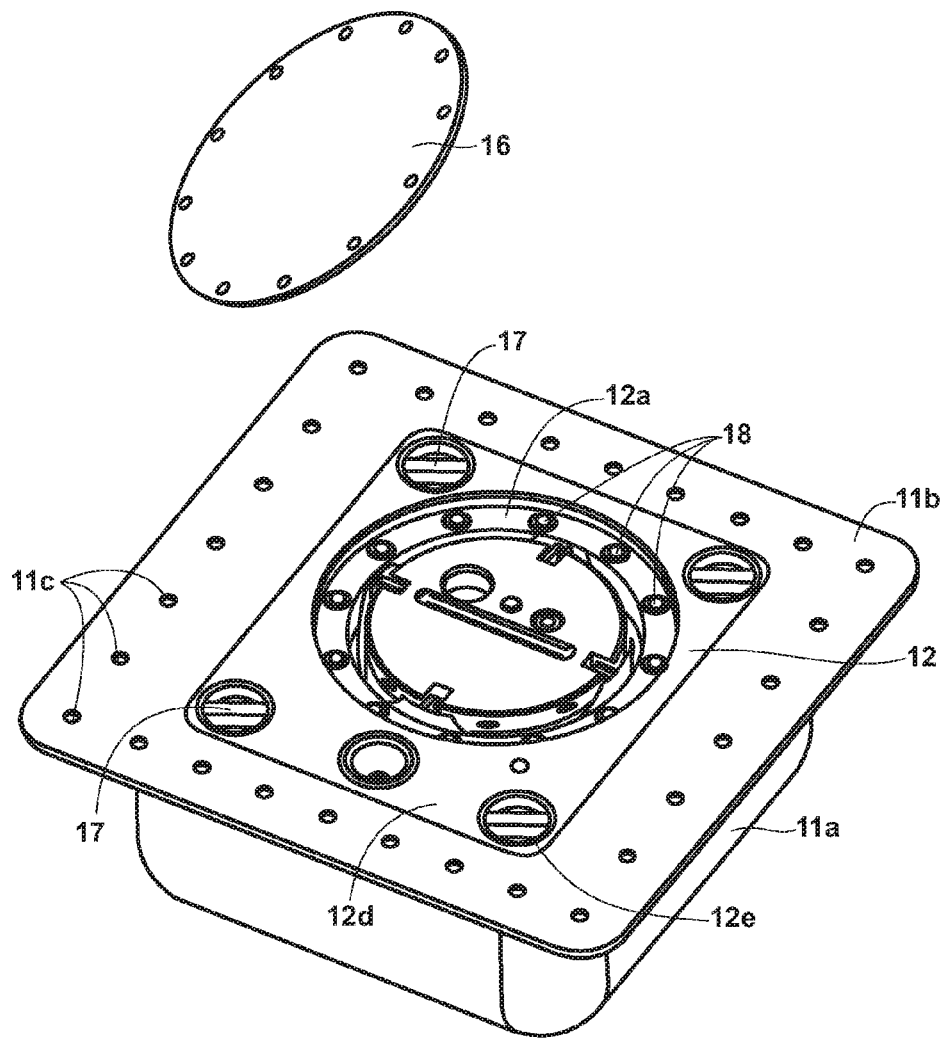
Figure 4:
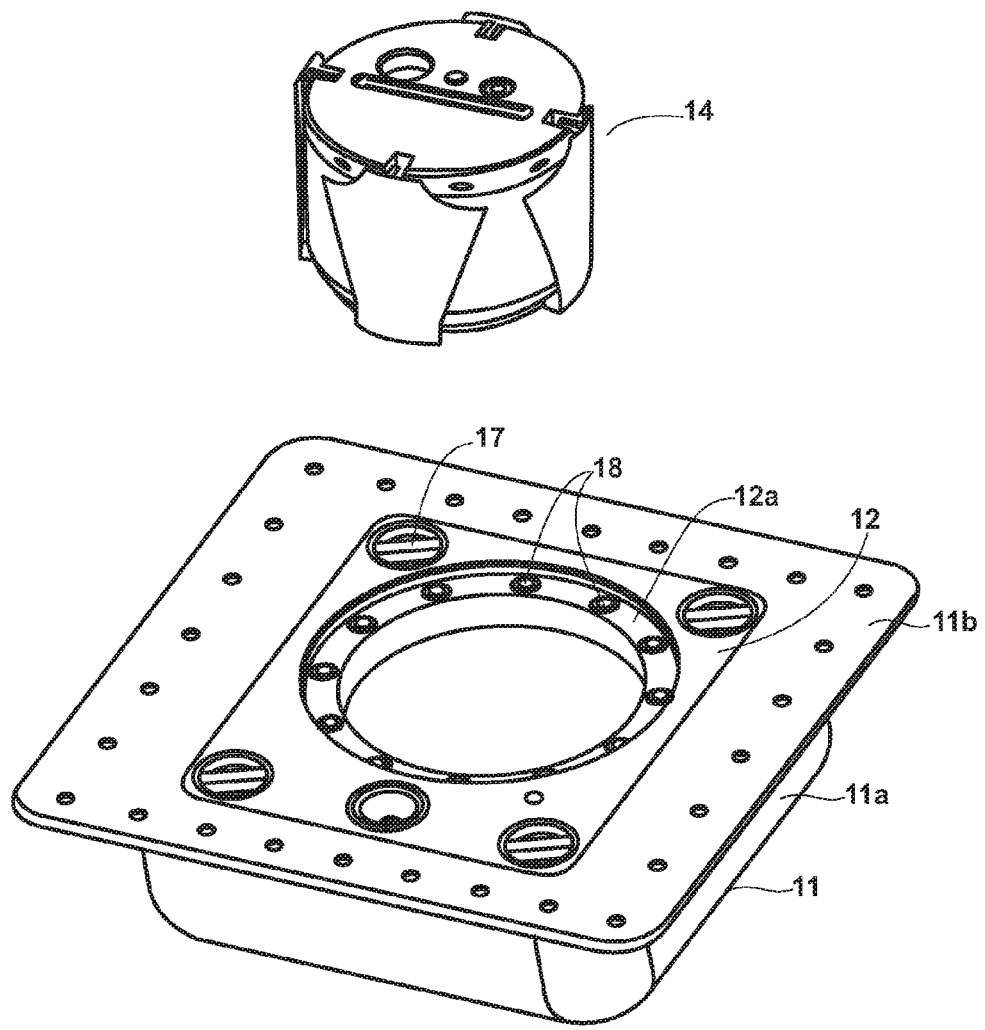
Figure 9:
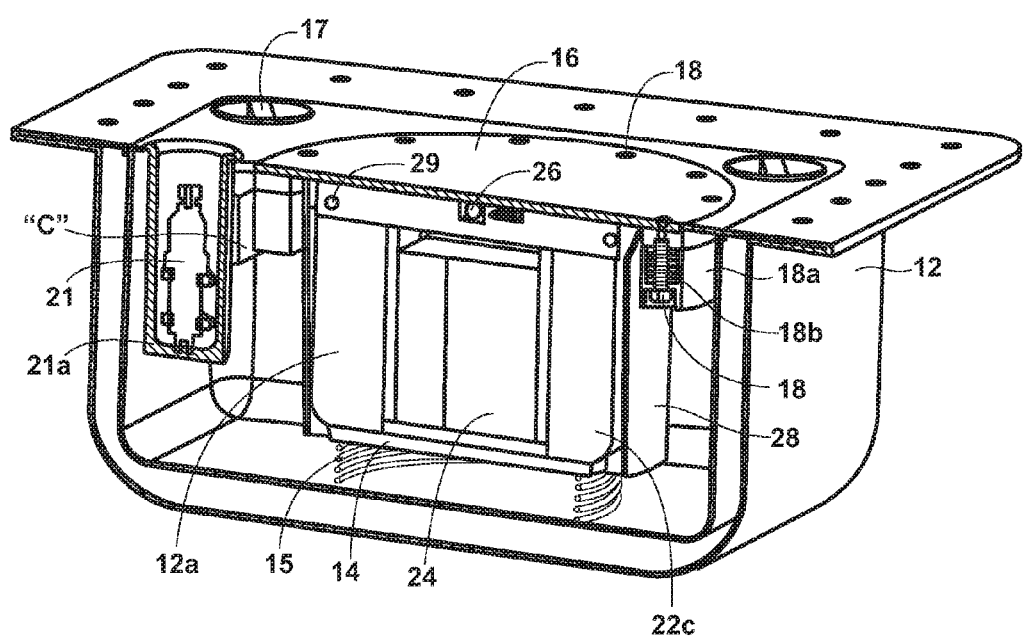
FIG. 9 is a sectional view taken along line A-A of FIG. 1.
Figure 10:
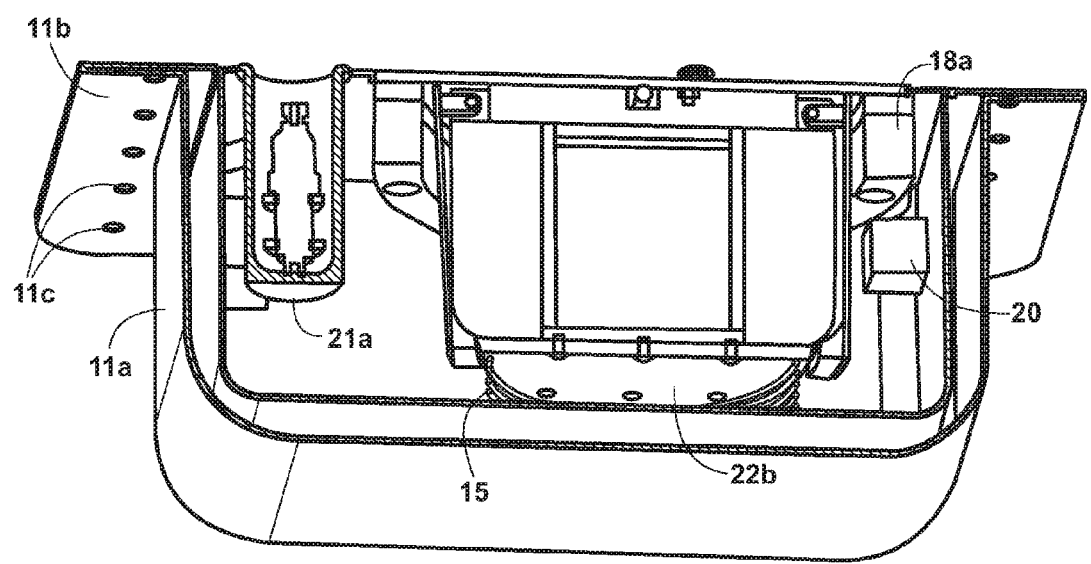
FIG. 10 is a sectional view taken along line B-B of FIG. 1.

Referring now to FIGS. 3, 4 and 9, the secondary enclosure is formed by a second peripheral flange 12a at the upper portion thereof and terminating to side walls and bottom walls 12b and 12c and top wall 12d. The associated cover 16 is provided on the secondary enclosure and secured on the second peripheral flange 12a by a means to secure and automatically detach the associated cover 16 from the second peripheral flange 12a to release and eject the locator transmitter member 14 to a substantial distance away from the second enclosure at a predetermined switching command.

Figure 1A:
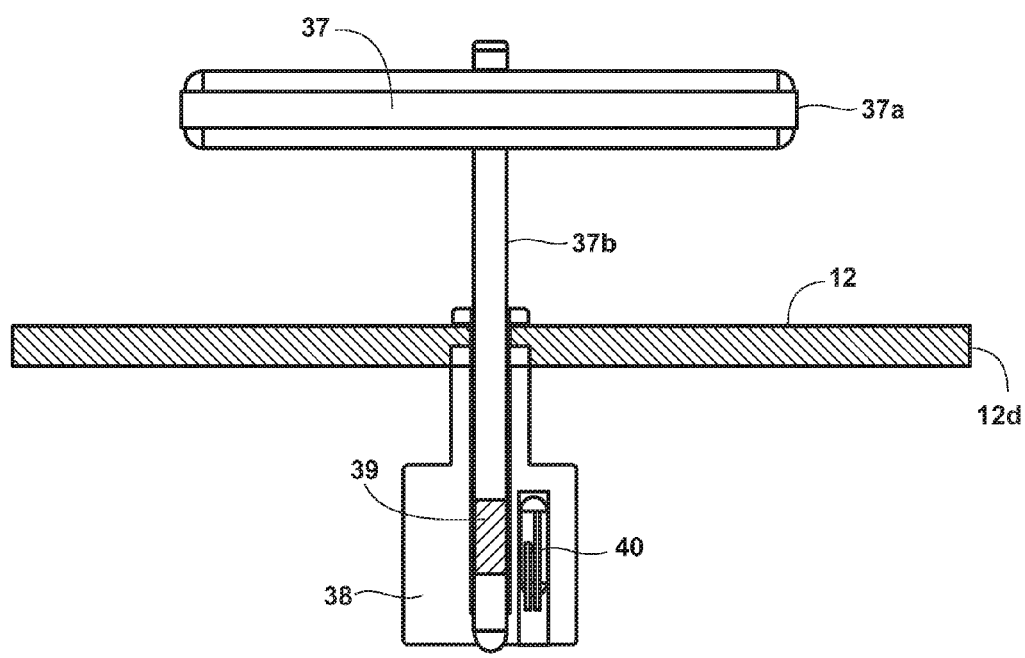
FIG. 1a is a sectional view showing the safety pin assembly of the present invention.
Figure 1B:
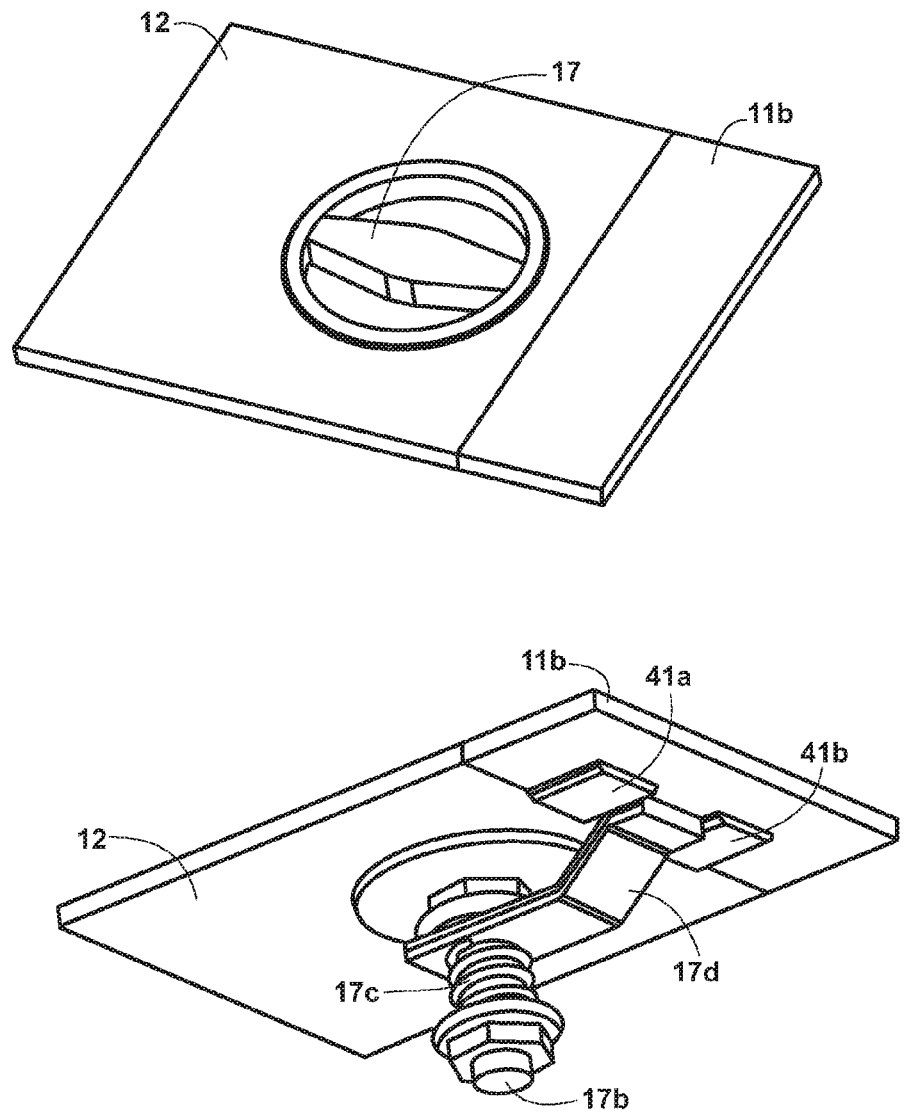
FIG. 1b is perspective view showing how the rotary latch engages and disengages the secondary enclosure from the primary enclosure.
Figure 2:
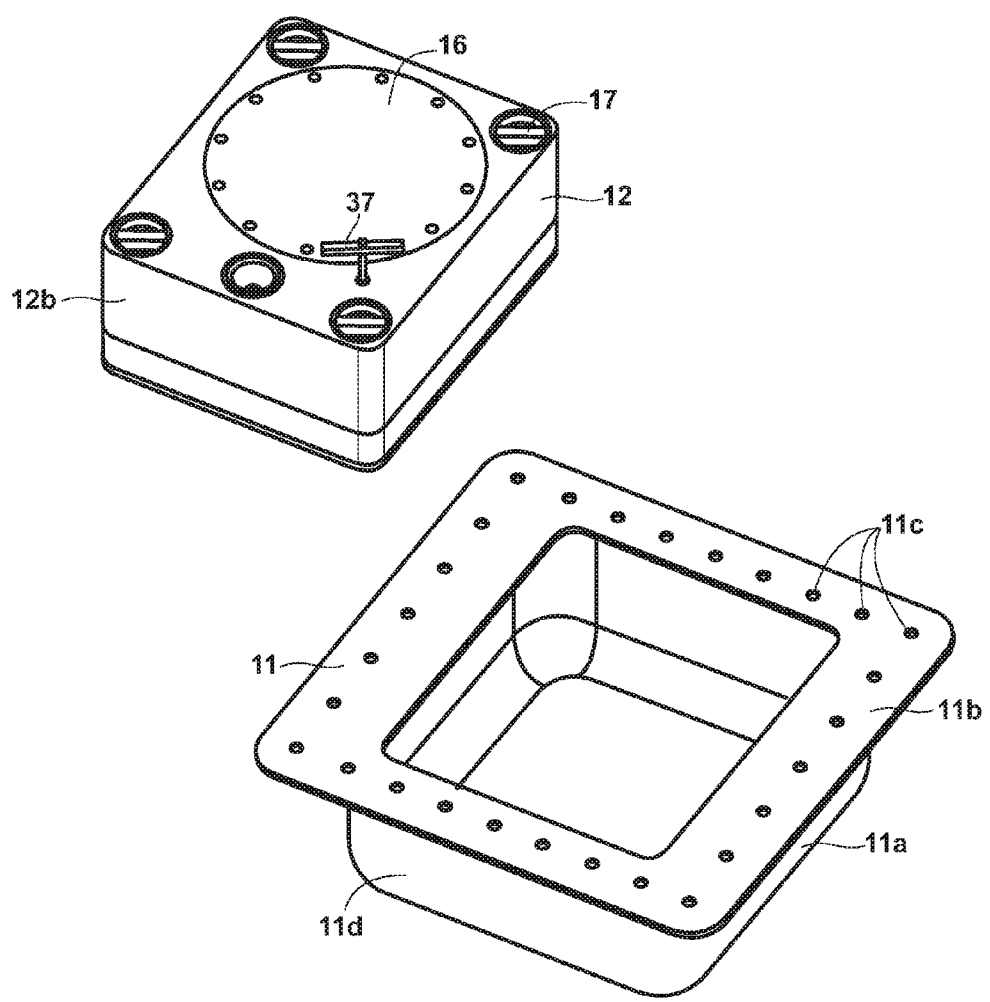
FIGS. 2 to 4 show an exploded view of the present invention for an automated locator transmitter assembly.

To maintain, check and clean the locator transmitter member 14, a plurality of rotary latch lock 17 is provided to remove the secondary enclosure from the primary enclosure as shown in FIG. 2. As shown in FIG. 1b, rotary latch 17 has a latch handle 17a rotatably provided on a depression 12e disposed at top wall 12d of second enclosure 12, the latch handle 17a has latch rod 17b downwardly extending through the underside of the top wall 12d of the second enclosure 12 and is spring biased by spring member 17c. A locking lever 17d is provided along the latch rod 17b. As further shown in the drawings, provided at the underside of the first peripheral flange 11b is a pair of spaced apart blocks 41a and 41b adapted to secure the forward portion of the locking lever 17d to engage or disengage the second enclosure 12 from the primary enclosure 11a when the latch handle 17a is rotated accordingly.

Referring back to FIGS. 3, 4 and 9, the means to secure and automatically detach the associated cover 16 from the second peripheral flange 12a comprises of a plurality of spaced apart explosive bolts 18 connecting said associated cover 16 along the second peripheral flange 12a. An automatic command controller "C" is operably connected to the explosive bolts 18 and calibrated to activate and detonate the explosive bolts 18 at a predetermined switching command. As shown in FIG. 9, the explosive bolts 18 are secured though the holes 16a of the associated cover 16 and the holes 12b provided on the second peripheral flange 12a. The explosive bolts 18 comprises of an explosive bolt assembly block 18a, an explosive bolt ejector 18b provided on said explosive bolt assembly block 18a and a bolt member 18c operably secured on the explosive bolt assembly block 18a.

The automatic command switch to activate and detonate the explosive bolts 18 is a first G-Switch 20, preferably, with a predetermined switching command calibrated to activate and detonate the explosive bolts 18 at a minimum "g-force" magnitude of 2.3 G in the forward direction along the flight path with at least 1 meter per second reverse velocity.

Further provided in the distress locator transmitter assembly 10 to serve as a redundant command switch to automatically detach the associated cover 16 from the second peripheral flange 12a in case first G-switch 20 fails to activate and detonate the explosive bolts 18 is a depth switch sensor 21 provided on the second enclosure 12 and also operably connected to the explosive bolts 18. The depth switch sensor 21 is encased on a casing 21a provided within the secondary enclosure 12. Depth switch sensor 21 also having a predetermined switching command is calibrated to activate and detonate the explosive bolts at a sea level preferably depth of at least 6 meters in case the first G-switch 20 fails to detonate the explosive bolts 18. The first G-switch 20 and the depth switch sensor 21 are connected to a power controller "C" located at the secondary enclosure 12.

Figure 5:
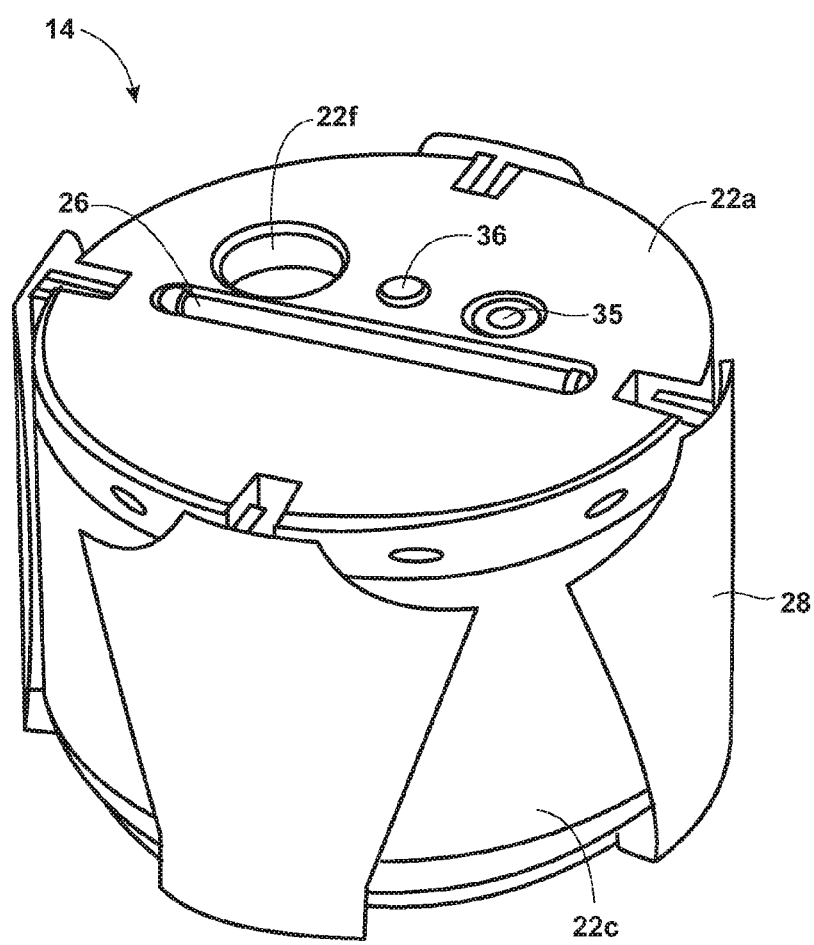
FIG. 5 is a perspective view of the distress locator transmitter device of the present invention.
Figure 6:
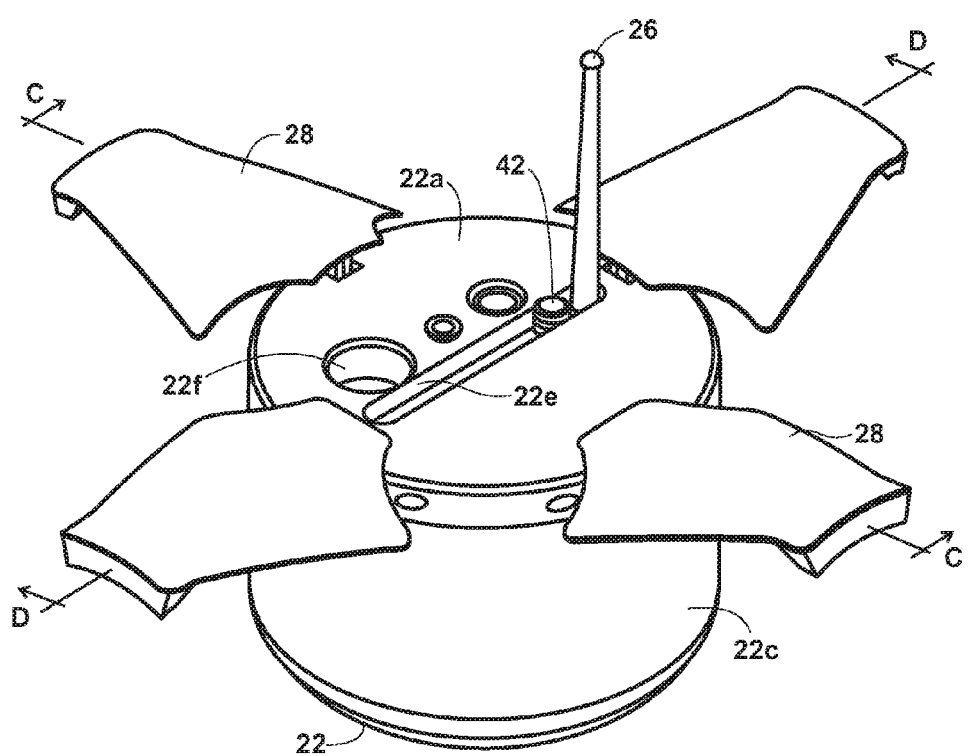
FIG. 6 is another perspective view of the locator transmitter device in operational position.
Figure 7:
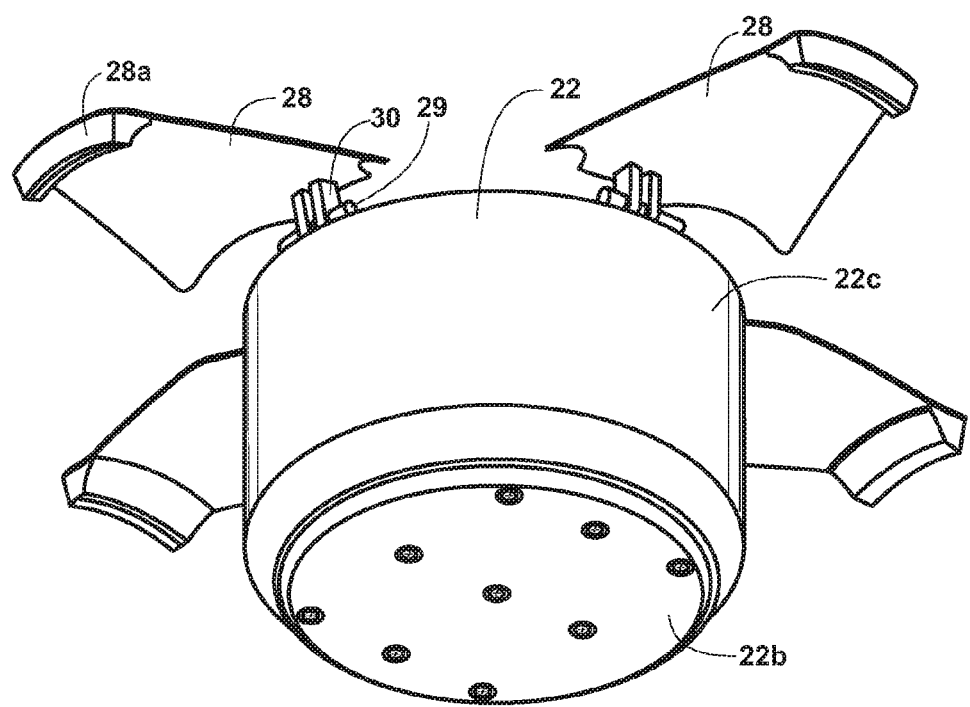
FIG. 7 is a bottom view of the locator transmitter device shown in FIGS. 5 and 6.
Figure 8:
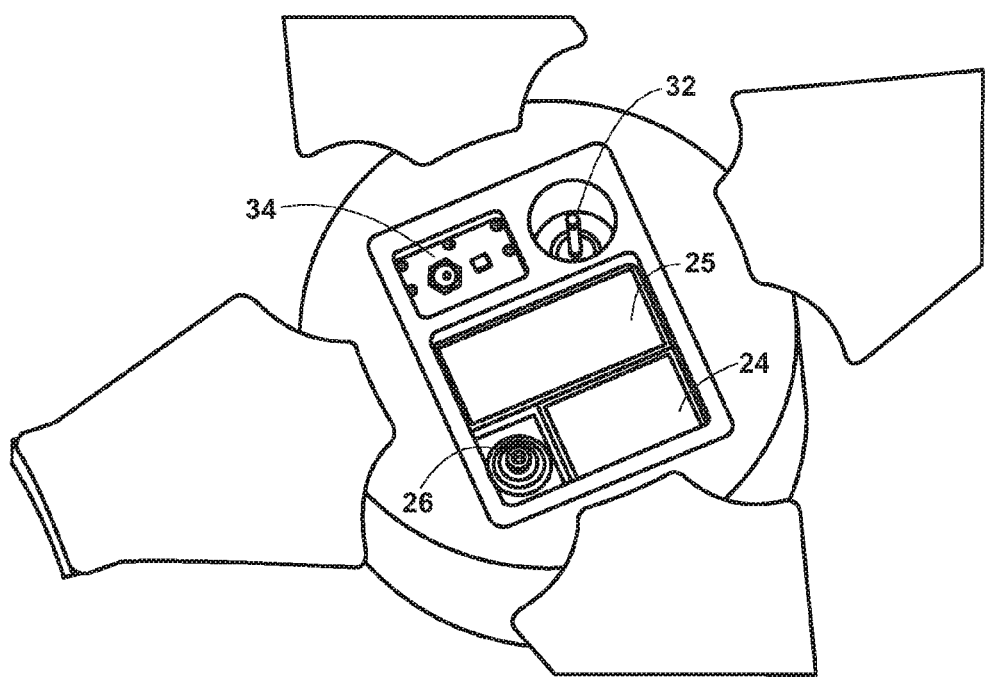
FIG. 8 is a top view showing the inner parts of the locator transmitter device when the top wall is removed.
Figure 8A:
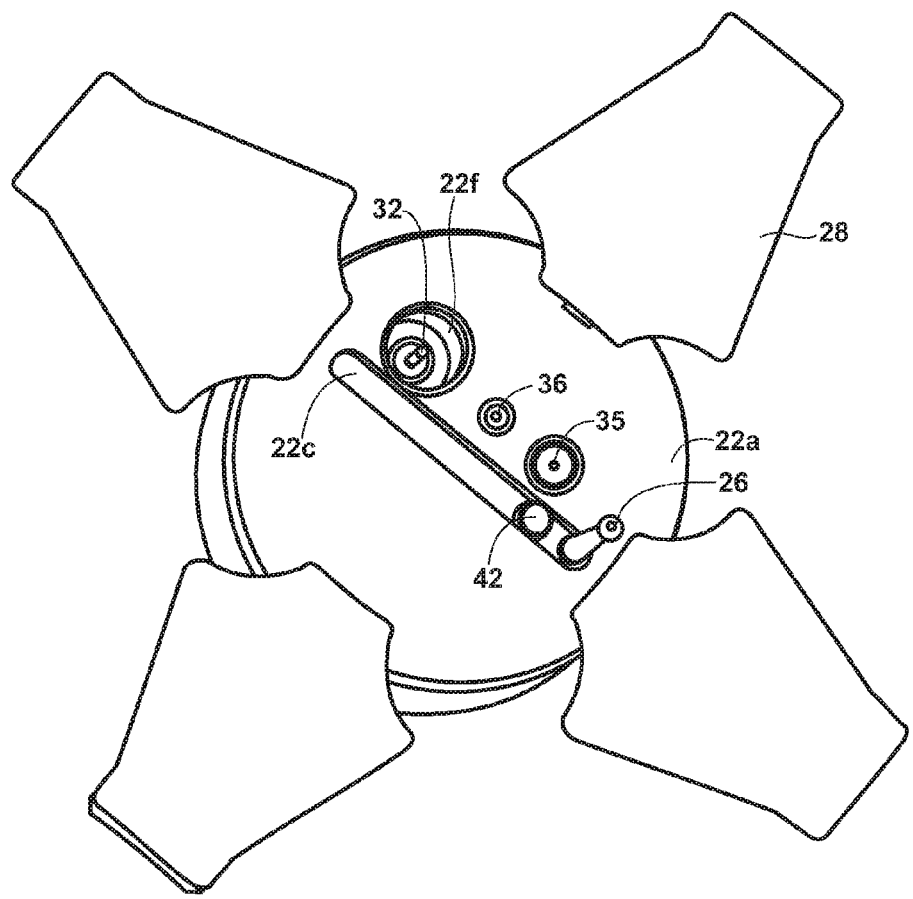
FIG. 8a is a top view thereof.

Referring now to FIGS. 5, 6 and 7, the locator transmitter member 14 comprises of a main body 22 having top wall 22a, a bottom wall 22b and sidewalls 22c, a central compartment 23 formed on the main body 22, a power source "P" provided within the central compartment 23, and a locator transmitter 24 also provided on the central compartment 23 of the main body 22 and a means to activate the locator transmitter 24.

Figure 11:
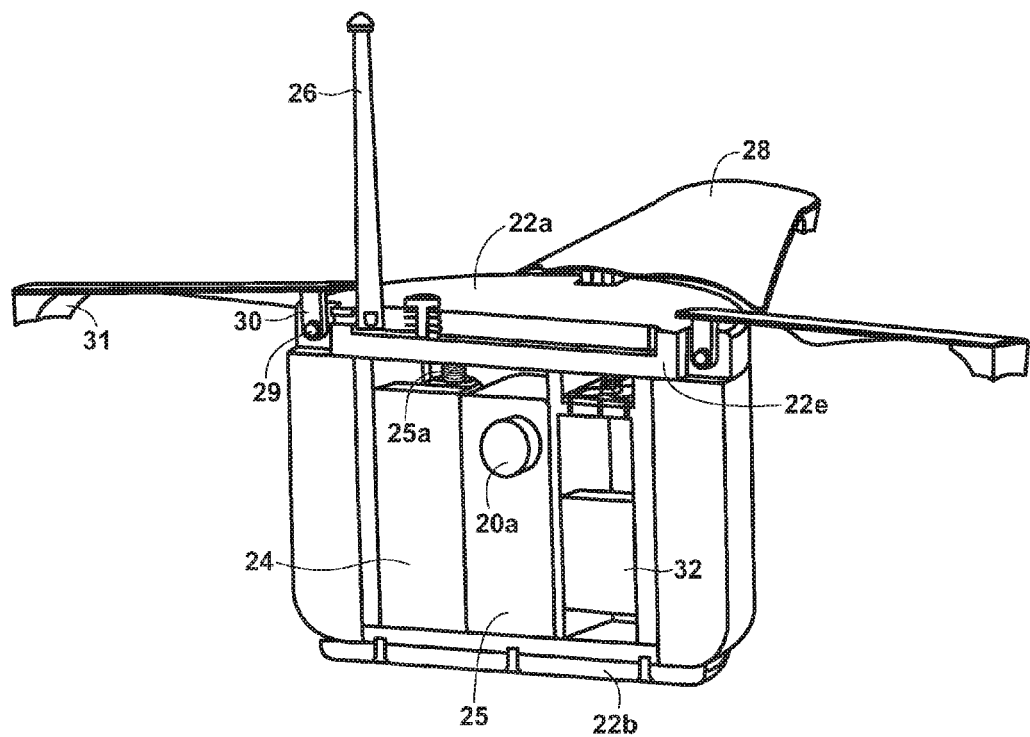
FIG. 11 is a sectional view taken along line C-C of FIG. 6.
Figure 12:
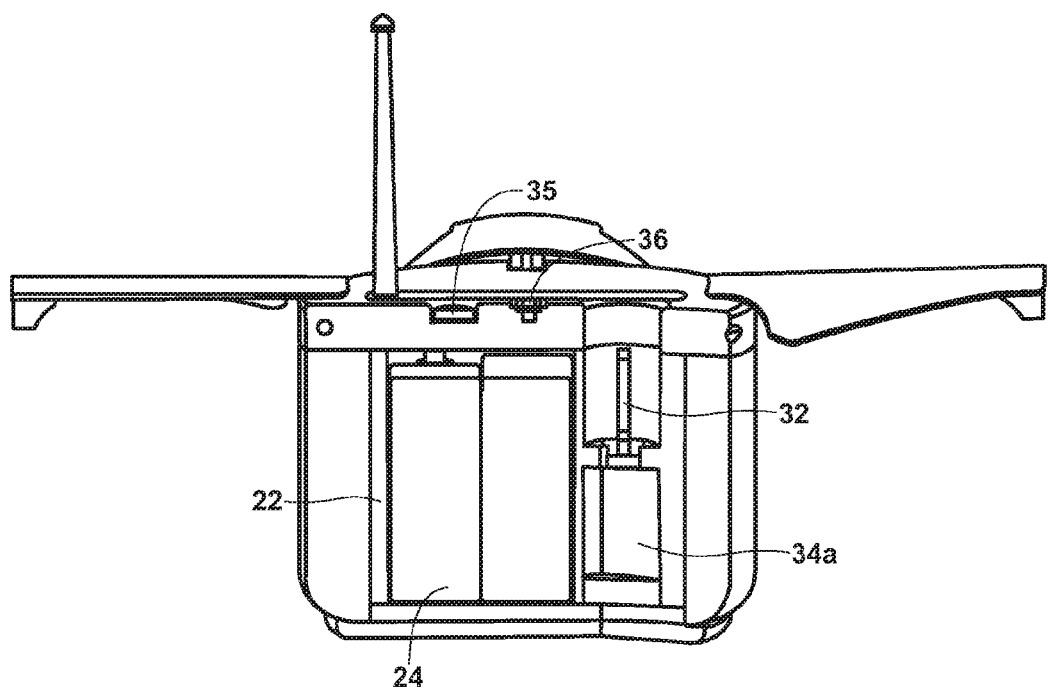
FIG. 12 is a sectional view taken along line D-D of FIG. 6.

As shown in FIGS. 11 and 12, the locator transmitter 24 comprises of a transmitter module 25 and at least one GPS antenna 26 operably connected to the transmitter module 25 via an antenna connector 25a, and is retractable and pivotally secured on top of the wall 22a of the main body 22. The top wall 22a of the main body is provided with a channel 22e along the surface thereof to house the GPS antenna 26 thereon. The locator transmitter 24 is preferably disposed adjacent to the power source "P" which is preferably a rechargeable battery module 25. The locator transmitter 24 is electronically connected to the battery module 27 which supplies power to enable the locator transmitter 24 to relay distress signal when the locator transmitter member 14 is released from the second enclosure 12. Preferably, the battery module 27 is a lithium-ion battery or alkaline battery.

Further provided on the locator transmitter member 14 is floatation means to allow the locator transmitter member 14 to float at sea when ejected from the secondary enclosure 12. The floatation means comprising a plurality of spaced apart wing stabilizers 28 provided on main body 22, each of the wing stabilizers 28 are formed by a longitudinal planar body pivotally secured at the periphery 22d of the top wall 22a of the locator transmitter member 14. As shown in FIG. 11 taken in conjunction with FIGS. 5 and 6, the wing stabilizers 28 are pivotally secured on the periphery 22d by means of a pivot rod 29 and support arm 30 disposed along the periphery 22d. When the locator transmitter member 14 is enclosed in the enclosure 12, the wing stabilizers are folded along the sidewalls 22c (see FIG. 5) and automatically open when the locator transmitter member 14 is released (see FIG. 6). The wing stabilizers 28 floating portions 31 at the free end portions 28a. The floating portions 31 are preferably made of rubberized floating-materials similar to the floating material to be used on sidewalls 22c of the main body 22.

The locator transmitter member 14 is activated by the activation of the locator transmitter 24 by a means to activate the locator transmitter which is preferably a second G-switch inside 25(not shown) which is connected to the locator transmitter 24. The second G-switch is activated simultaneously with said first G-switch at a predetermined switching command.

In accordance with the present invention, preferably, the second G-switch having a predetermined switching command to activate the locator transmitter 24 simultaneously with the detonation of the explosive bolts 18 with a minimum "g-force" magnitude of 2.3 G in the forward direction along the flight path with at least 1 meter per second reverse velocity.

Figure 14:
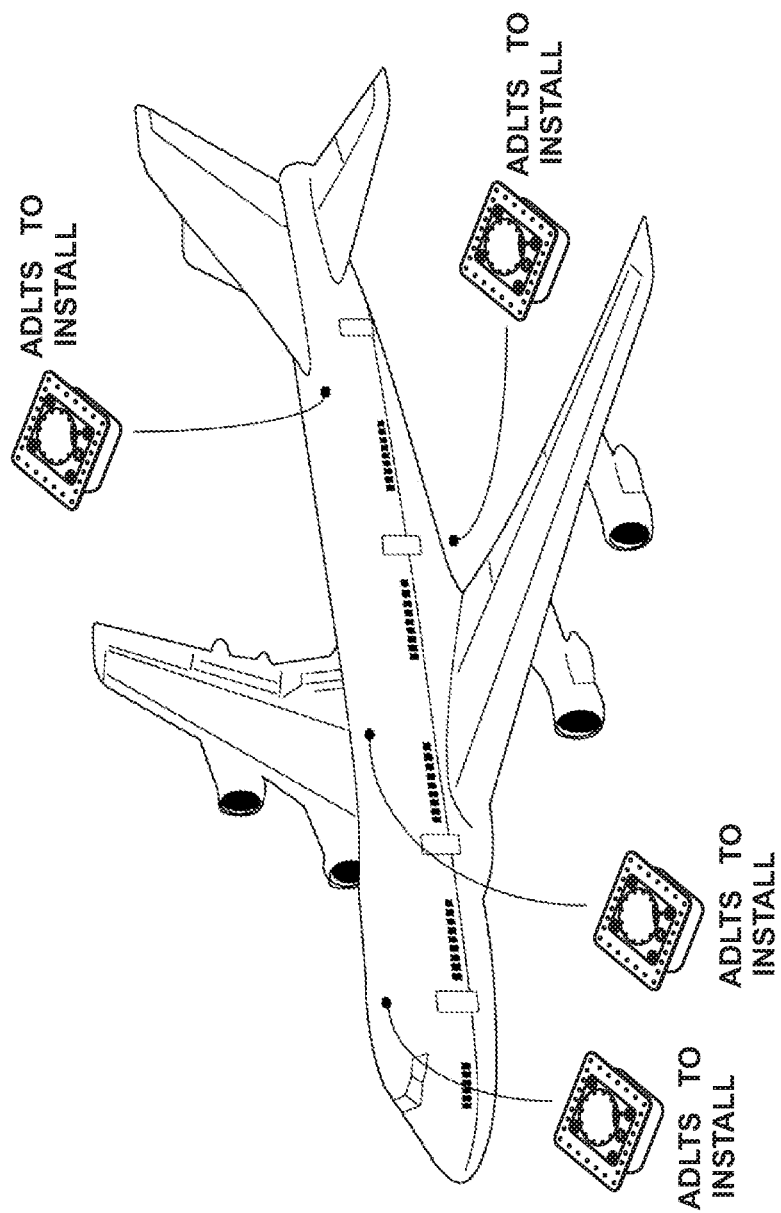
FIG. 14 is a perspective view of an aircraft showing how the automated distress locator transmitter assembly of the present invention is installed.

Referring again to FIGS. 12 and 14, a first redundant means is provided to activate the locator transmitter 24 which comprises of a water conductivity switch 32 provided on the locator transmitter member ready to be activated upon the submersion of the locator transmitter member at sea. The conductivity switch 32 comprises of a water conductivity switch sensor 33 and a water conductivity switch panel 34 and a water conductivity switch controller 34a which are provided at the top wall 22a and inner portion of the main body 32 and are operably connected to the adjacent locator transmitter 24 and battery module 25. A depressed portion 22f is provided on the top wall 22a where the conductivity switch 32 is disposed.

Figure 13:
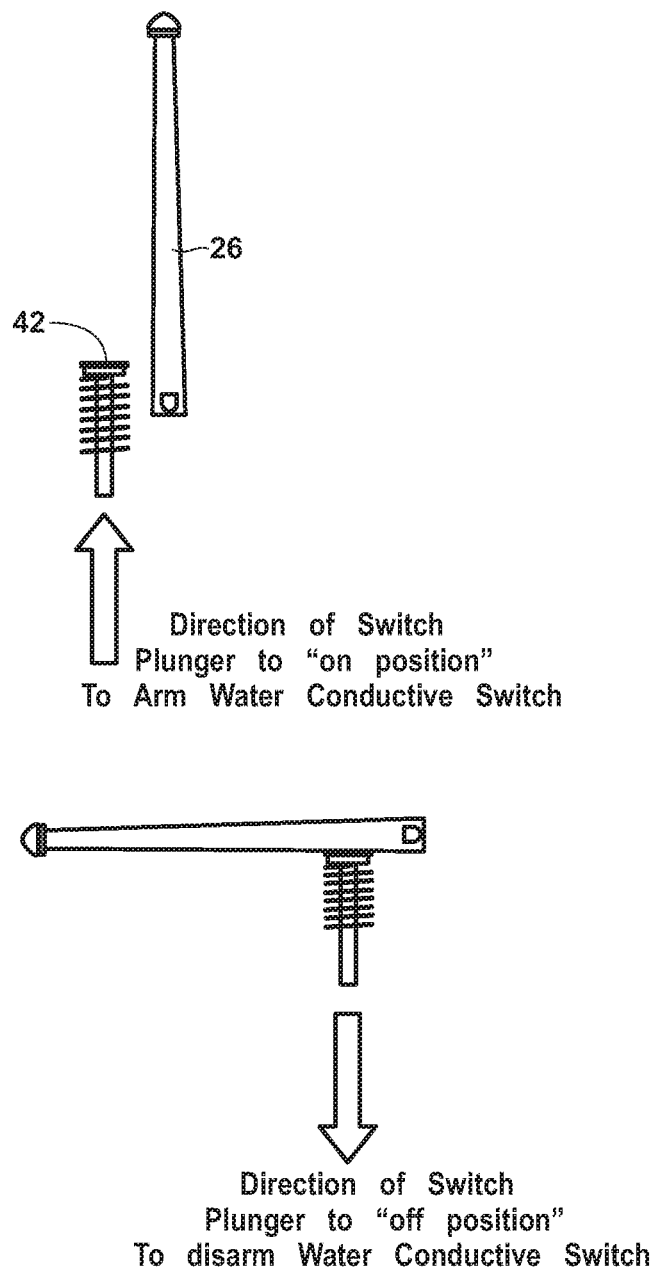
FIG. 13 is a view showing the configuration of the antenna in relation to the arming and disarming the water conductivity switch.

Referring now to FIG. 13, a spring biased switch plunger 42 is provided in relation to and along the pivot direction of the GPS antenna 26. The spring biased 42 is connected to the conductivity switch 32 controller 34a in order to arm or disarm the conductivity switch 32. This is necessary in order to prevent the water conductivity switch 32 to activate due to condensation of water that may accumulate during flight. As shown in FIG. 13, when the antenna 26 is in the retracted horizontal position the switch plunger 42 is biased and disarms the water conductivity switch controller 34a and effectively prevents the activation of the locator transmitter 24 while still inside the second enclosure due to possible water condensation. When the explosive bolts 18 detonates and the locator transmitter member 14 is ejected, the antenna 26 is immediately retracted to the vertical position as the locator transmitter is also activated to relay distress location signal.

Referring again to FIGS. 12 and 14, a second redundant means is provided to activate the locator transmitter 24 which comprises of a manual switch 35 acting as a redundant switch provided on the top wall of the main body 22. The manual switch 22 is operably connected to the locator transmitter 24. A light indicator 36 is also provided on the top wall 22a of the main body to indicate if the locator transmitter 24 is in the active mode.

A safety pin 37 is provided on the enclosure 12 to disarm the explosive bolts 18 when not in used. As shown in FIG. 1a, the safety pin 37 is provided and secured on top wall 12d of the second enclosure 12. The safety pin 37 having a safety pin handle 37a and safety pin rod 37b is connected to a reed switch housing 38 provided below the top wall 12d of the enclosure 12. The reed switch housing 38 is further provided with a permanent magnet 39 extending from the safety pin rod 37b and provided at the bottom portion thereof and a reed switch capsule 40. The safety pin 37 contains the permanent magnet 39. When the safety pin 37 is inserted inside the reed switch housing 38 via the safety pin rod 37b, the magnet 39 opens the normally closed switch of the reed switch capsule 40. This reed switch capsule 40 disarms the explosive controller that is connected to the explosive bolts 18.

In another embodiment of the present invention, a distress locator device adapted to be installed on transportation means such as aircrafts is herein provided. The distress locator device is the distress locator member 14 which has been previously described in the preceding description.

To install the automated distress locator assembly 10, the base member 11 is first installed on different strategic parts of the aircraft as shown in FIG. 13. Installation of the base member 11 is done by securing the primary enclosure 11a onto a depressed surface of the aircraft and applying bolts on the first peripheral flange and through the surface of the aircraft. The depressed surface in the aircraft may be fabricated and formed during the installation the assembly 10. The secondary enclosure 12 is then installed within the primary enclosure 11 and is lock therein by the locking latches 17. The distress locator transmitter member 14 (or the ELT device) is then installed on the central compartment 23 of the second enclosure 12. The automatic command switches (first G-switch 20, depth switch sensor 21, are connected to the explosive bolts 18. The second G-switch 20a, the water conductivity switch 32 and the manual switch 35) are connected to switch on the locator transmitter 24 in accordance with the present invention before the associated is finally secured to the second enclosure 12.

In operation, the associated cover 16 is automatically detached and removed from the second enclosure 12 upon the detonation of the explosive bolts 18 during emergency or crash landing of the aircraft when the predetermined switching command has been attained. This action immediately ejects and releases the distress locator transmitter 14 at a substantial distance away from the plane and towards land or sea depending on the terrain where the emergency or crash landing has taken place. The distress locator transmitter 14 is ejected from the central compartment 23 of the second enclosure 12 when the first G-switch is activated at the predetermined or preset G-force to detonate the explosive bolts. In case of sea landing and the first G-switch 20 fails to activate, the depth switch sensor 21 which serves as a redundant switch will activate and detonate the explosive bolts 18 at the preset sea level, which is according to the present invention, is at least 6 meters deep. The locator transmitter 24 provided within the distress locator transmitter member 14 is activated by a second G-switch 20a simultaneous to the activation of the first G-switch 20. The second G-switch 20a is mounted within the locator transmitter 24 (Emergency Locator Transmitter) as shown in FIG. 11.

In case of sea landing and the second G-switch 20a fails to activate, the water conductivity switch 32 automatically activates the locator transmitter 24 when the depressed portion 22f is filled with water to activate the water conductivity switch sensor 33. Upon release of the distress locator member 14 from the aircraft which has landed below sea level, the same will immediately float towards the upper surface of the sea via the wing stabilizers which are automatically positioned in a contiguous manner with the top wall 22a of the main body 22 of the distress locator member 14. At this moment, the GPS antenna 26 is retracted to a transmitting position as shown in FIGS. 11 and 12.

The emergency manual switch 35 is provided in case where a survivor happens to get hold of the locator transmitter member 14 and to activate the same as indicated by the light indicator 36.

While there have been illustrated and described, what are considered to be preferred embodiment of the present invention, it will be apparent to those skilled in the art that various modifications and variations can be made, and equivalents may be substituted for the elements thereof without departing from the spirit or scope of the present invention. Thus, it is intended that the present invention is not be limited to the particular embodiment disclosed as the best mode contemplated for carrying out the present invention, but that the present invention includes all embodiments falling within the scope of the appended claims and their equivalents.

The invention claimed is:

1. An automated distress locator transmitter assembly adapted to be installed on transportation means such as aircrafts and the like comprising: a base member having a primary enclosure downwardly formed from the surface thereof and defining a first peripheral flange thereon; a secondary enclosure having a second peripheral flange formed at the upper portion thereof, said secondary enclosure being enclosed within said primary enclosure and being provided with an ejector means; a locator transmitter member being provided within said secondary enclosure and secured on said ejector means; an associated cover being provided on said secondary enclosure, said associated cover being secured on said second peripheral flange; and means to secure and automatically detached said associated cover from said second peripheral flange to release and eject said locator transmitter member to a substantial distance away from said second enclosure at a predetermined switching command, wherein said means to secure and automatically detached said associated cover from said second peripheral flange comprising a plurality of spaced apart explosive bolts connecting said associated cover along said second peripheral flange and an automatic command switch operably connected to said explosive bolts, said command switch being calibrated to activate and detonate said explosive bolts at a predetermined switching command.

2. The automated distress locator transmitter assembly in accordance with claim 1, wherein said automatic command switch is a first G-Switch with a predetermined switching command calibrated to activate and detonate said explosive bolts at a minimum "g-force" magnitude of 2.3 G in the forward direction along the flight path with at least 1 meter per second reverse velocity.

3. The automated distress locator transmitter assembly in accordance with claim 1, further comprising a redundant command switch to automatically detach said associated cover from said second peripheral flange in case said command switch fails to activate and detonate said explosive bolts.

4. The automated distress locator transmitter assembly in accordance with claim 3, wherein said redundant command switch is a depth switch sensor provided on said second enclosure and operably connected to said explosive bolts, said depth switch sensor having a predetermined switching command calibrated to activate and detonate said explosive bolts at a sea level depth of at least 6 meters.

5. The automated distress locator transmitter assembly in accordance with claim 1, wherein said locator transmitter member comprising a main body having top wall, bottom wall and sidewalls and a central compartment being formed thereon; a power source being provided on said compartment; a locator transmitter being provided on said central compartment of said main body, said transmitter being electronically connected to said power source; and means to activate said locator transmitter.

6. The automated distress locator transmitter assembly in accordance with claim 5, wherein said locator transmitter member further comprising floatation means to allow said transmitter member to float at sea when ejected from said secondary enclosure.

7. The automated distress locator transmitter assembly in accordance with claim 6, wherein said floatation means comprising a plurality of spaced apart wing stabilizers provided on said main body, each said wing stabilizers being formed by a longitudinal planar body pivotally secured at the top wall of said locator transmitter member.

8. The automated distress locator transmitter assembly in accordance with claim 5, wherein said locator transmitter comprising a transmitter module and at least one GPS antenna operably connected to said transmitter module.

9. The automated distress locator transmitter assembly in accordance with claim 5, wherein said means to activate said locator transmitter comprising a second G-switch connected to said locator transmitter and is activated simultaneously with said first G-switch at a predetermined switching command.

10. The automated distress locator assembly in accordance with claim 9, wherein said second G-switch having a predetermined switching command to activate said locator transmitter simultaneously with the detonation of said explosive bolts at a minimum "g-force" magnitude of 2.3 G in the forward direction along the flight path with at least 1 meter per second reverse velocity.

11. The automated distress locator assembly in accordance with claim 5, wherein said means to activate said locator transmitter comprising a water conductivity switch provided on said locator transmitter member to act as a redundant switch ready to be activated upon submersion of said locator transmitter member at sea.

12. The automated distress locator assembly in accordance with claim 5, wherein said means to activate said locator transmitter comprising a manual switch acting as a redundant switch provided on the top wall of said man body, said manual switch is operably connected to said locator transmitter.

13. A distress locator device adapted to be installed on transportation means such as aircrafts and the like comprising: a main body having a top wall, a bottom wall and sidewalls and a central compartment being formed thereon; a power source being provided on said central compartment; a locator transmitter being provided on said central compartment of said main body, said locator transmitter being electronically connected to said power source, said locator transmitter comprising a transmitter module and at least one GPS antenna operably connected to said transmitter module; a floatation means comprising a plurality of spaced apart wing stabilizers provided at the sidewalls of said main body, each said wing stabilizers being formed by a longitudinal planar body pivotally secured at the top wall of said locator transmitter member; and means to activate said locator transmitter, said locator transmitter comprising a water conductivity switch is provided on said locator transmitter member to act as a redundant switch ready to be activated upon submersion of said locator transmitter member at sea.

14. The automated distress locator device in accordance with claim 13, wherein said means to activate said locator transmitter comprising a G-switch connected to said locator transmitter and is activated simultaneously with the corresponding G-switch of an enclosure adapted to house said locator transmitter and release said locator transmitter at a predetermined switching command.

15. The automated distress locator assembly in accordance with claim 14, wherein said G-switch having a predetermined switching command to activate said locator transmitter simultaneously with its release from said enclosure at a minimum "g-force" magnitude of 2.3 G in the forward direction along the flight path with at least 1 meter per second reverse velocity.

16. The automated distress locator assembly in accordance with claim 13, wherein said means to activate said locator transmitter comprising a manual switch acting as a redundant switch provided on the top wall of said man body, said manual switch is operably connected to said locator transmitter.

* * * * *